(12) United States Patent
Barrall et al.

(10) Patent No.: US 8,225,135 B2
(45) Date of Patent: Jul. 17, 2012

(54) SYSTEM AND METHOD FOR PROTECTING USERS OF DATA STORAGE SYSTEMS AGAINST KNOWN PROBLEMS

(75) Inventors: Geoffrey S. Barrall, San Jose, CA (US); Julian M. Terry, Mountain View, CA (US); Mark J. Herbert, Danville, CA (US)

(73) Assignee: Drobo, Inc., San Jose, CA (US)

( * ) Notice: Subject to any disclaimer, the term of this patent is extended or adjusted under 35 U.S.C. 154(b) by 0 days.

(21) Appl. No.: 12/823,732

(22) Filed: Jun. 25, 2010
(Under 37 CFR 1.47)

(65) Prior Publication Data
US 2011/0154123 A1 Jun. 23, 2011

Related U.S. Application Data

(60) Provisional application No. 61/223,496, filed on Jul. 7, 2009.

(51) Int. Cl.
*G06F 11/00* (2006.01)
(52) U.S. Cl. .................. 714/6.1; 714/42; 717/168
(58) Field of Classification Search .................. None
See application file for complete search history.

(56) References Cited

U.S. PATENT DOCUMENTS

| | | | | |
|---|---|---|---|---|
| 7,231,493 | B2 * | 6/2007 | Nguyen et al. | 711/114 |
| 7,340,642 | B1 * | 3/2008 | Coatney | 714/5.1 |
| 7,389,379 | B1 * | 6/2008 | Goel et al. | 711/112 |
| 7,814,272 | B2 | 10/2010 | Barrall et al. | 711/114 |
| 7,814,273 | B2 | 10/2010 | Barrall | 711/114 |
| 7,818,531 | B2 | 10/2010 | Barrall | 711/170 |
| 2002/0188934 | A1 * | 12/2002 | Griffioen et al. | 717/170 |
| 2003/0212856 | A1 * | 11/2003 | Nichols | 711/114 |
| 2005/0144616 | A1 * | 6/2005 | Hammond et al. | 717/173 |
| 2006/0174157 | A1 | 8/2006 | Barrall et al. | 714/6 |
| 2006/0225069 | A1 * | 10/2006 | Yuuki | 717/170 |
| 2010/0121909 | A1 * | 5/2010 | Tsai et al. | 709/203 |

* cited by examiner

*Primary Examiner* — Michael Maskulinski
(74) *Attorney, Agent, or Firm* — Sunstein Kann Murphy & Timbers LLP

(57) ABSTRACT

Methods and apparatus automatically identify certain types of data storage system problems, such as a flawed storage device or an incompatibility between a data storage system and a data storage device or an incompatibility between the storage system and a user computer. The existence of such a problem may be highlighted to a user through an indicator on the storage system and/or through a "dashboard" application being executed by the user computer, and the problem may be automatically corrected by automatically downloading a fix (e.g., new firmware or a "patch") from a server (e.g., a server managed by the storage device manufacturer, a server managed by the storage system manufacturer and/or a server managed by a third party) and automatically implementing the fix.

40 Claims, 11 Drawing Sheets

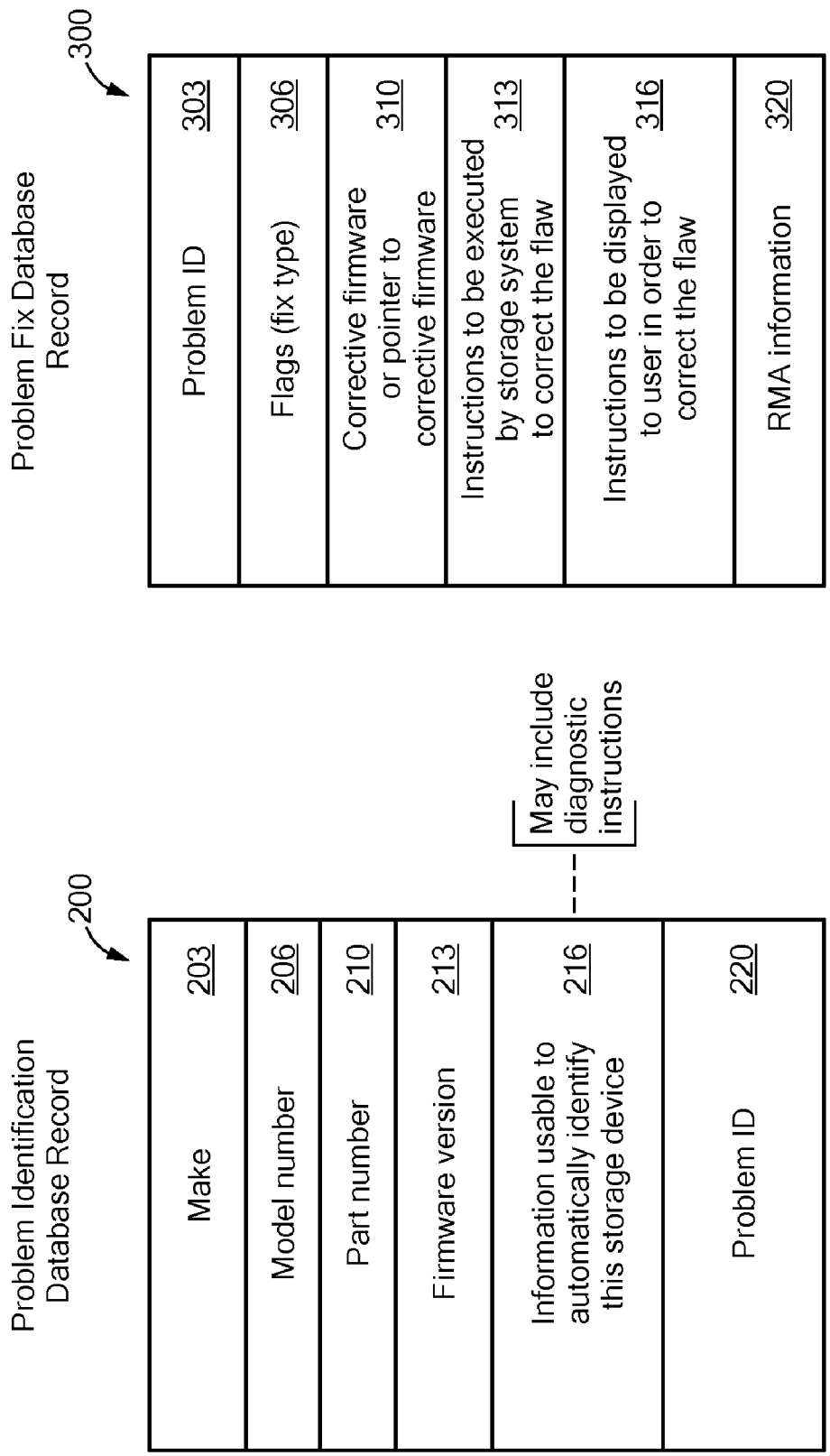

SYSTEM AND METHOD FOR PROTECTING USERS OF DATA STORAGE SYSTEMS AGAINST KNOWN PROBLEMS

CROSS REFERENCE TO RELATED APPLICATIONS

This application claims the benefit of U.S. Provisional Patent Application No. 61/223,496, filed Jul. 7, 2009, titled "System and Method for Protecting Users of Data Storage Systems Against Known Problems," the entire contents of which are hereby incorporated by reference herein, for all purposes.

TECHNICAL FIELD

The present invention relates to digital data storage systems and, more particularly, to such systems that detect issues related to flawed disk drives and warn users or automatically resolve the issues.

BACKGROUND ART

Data storage systems include provisions for housing and managing one or more physical storage devices and making storage space on the installed storage devices available to one or more data-connected user computers. A storage system that includes multiple storage devices is sometimes referred to as a storage "array." A storage array may have bays or slots in which storage devices can be installed. A storage array may support one or more types of storage device (e.g., magnetic disk drives, optical disk drives, solid state storage such as flash and USB drives, tape drives, etc.). The DROBO™ data storage system available from Data Robotics, Inc., Santa Clara, Calif., is an example of a storage array having slots for multiple storage devices (specifically disk drives). Typically, the cumulative storage space of all the storage devices (less space used for overhead and redundancy) is made to appear to the user computers as a single virtual disk. Storage systems control the installed storage devices and manage the storage capacity provided by the installed storage devices. For example, some data storage systems may store data redundantly on two or more of the installed storage devices, in case one of the storage devices fails.

Auxiliary applications, sometimes referred to as "dashboard" applications, provide user interfaces to data storage systems. For example, a dashboard application may provide a graphical display, such as a pie chart, that indicates how the storage space on the storage devices is currently being used, i.e., the amount of storage space that is currently free, reserved for expansion, used for protection (data redundancy) and used for overhead. A dashboard application may be executed by a user computer that is connected to a data storage system via a wired or wireless computer network, a universal serial bus (USB) cable, or the like.

Many such data storage systems are designed to be used by unsophisticated users. For example, a data storage system may be configured such that storage devices may be added to or removed from the data storage system by a user without use of tools, without powering down the data storage system or the user computer, and without the user interacting with any management software. A user may increase the total amount of storage space in the data storage system simply by sliding an additional storage device into an available slot or by replacing an existing storage device with a larger capacity storage device. Similarly, a user may replace a failed storage device with a replacement storage device.

Software in the data storage system automatically detects the insertion and removal of storage devices. In response, the software formats newly inserted storage devices, copies data to storage devices that have been inserted to replace failed storage devices, etc. Thus, the user may treat the data storage system as a storage "appliance," without understanding or managing its operation. The user may treat physical storage devices as commodities having stated capacities.

Despite being able to be treated as simple replaceable commodities, storage devices are actually quite complex devices that include sophisticated electronic and/or electro-mechanical subsystems, including processors and firmware. Occasionally, a manufacturer inadvertently releases a batch of flawed storage devices. For example, a flaw may involve a mismatch between firmware installed on a disk drive and an electronic or mechanical component in the disk drive. Such a disk drive may fail or it may cause other problems if used in a data storage system.

Unfortunately, unsophisticated users of data storage systems typically do not monitor release notes or check for product recalls issued by storage device manufacturers. Such a user is not likely to understand the significance of a flaw or the importance of resolving a flaw-related issue with a storage device. Even if a user of a data storage system were to become aware of a flaw in one of his/her storage devices, the user is unlikely to be technically versed enough to resolve the issue, which may involve obtaining revised firmware from the storage device manufacturer and installing the revised firmware in the storage device. Furthermore, data storage systems are typically marketed to users who prefer not to manage their systems. Consequently, issues related to flawed storage devices are likely to go unresolved and may cause catastrophic data loss or other problems within data storage systems.

SUMMARY OF EMBODIMENTS

An embodiment of the present invention provides a processor-implemented method for automatically identifying a flawed data storage device installed in a data storage system. The data storage system is configured to manage a plurality of user-swappable data storage devices installed in the data storage system. Information about a flaw in a data storage device is automatically obtained from outside the data storage system. Information is automatically fetched from a data storage device installed in the data storage system. The fetched information includes information about the installed data storage device. The information about the flaw and the information about the installed data storage device are used to automatically identify the installed data storage device as being flawed.

The information about the flaw may identify firmware such as updated or corrected firmware, and the firmware may be automatically installed into the identified data storage device. The firmware may be automatically obtained from a remote server prior to it being installing into the identified data storage device. The information about the flaw may include computer-executable instructions, and the instructions may be automatically executed by a processor within the data storage system or by another processor.

Optionally or additionally, information about the identified data storage device may be displayed on a user interface (UI). The user interface may be part of a data storage system or part of another computer, for example a dashboard application. Optionally, information identifying the identified data storage device and/or information about the flaw may be displayed on the user interface.

The information about the flaw may be obtained from a remote server. Obtaining the information about the flaw may include obtaining information about resolving an issue related to the flaw. In addition, the information about resolving the issue related to the flaw may be displayed, such as on the user interface. For example, a plurality of user options may be displayed, and a user input may be received to indicate selection of one of the displayed user options. Optionally, the selected option may be automatically implemented, in response to receiving the input.

The information about the flaw may identify firmware, and firmware may be automatically installed into the identified data storage device, in response to receiving the input. Automatically installing the firmware may involve automatically obtaining the firmware from a remote server prior to installing the firmware into the identified data storage device and/or reading the firmware from a user-specified location.

Displaying the information about resolving the issue related to the flaw may involve displaying user instructions for resolving the issue related to the flaw. Displaying the information about resolving the issue related to the flaw may include automatically generating a document for use in shipping the flawed data storage device such as a shipping label. Optionally, authorization to send the identified data storage device to a vendor may be automatically obtained. The automatically generated document may include a reference to the authorization.

The availability of information about a flaw in a data storage device may be checked, such as based on a predetermined schedule. Optionally or alternatively, the availability of information about a flaw in a data storage device may be checked in response to installation of a data storage device in the data storage system.

A notification may be received, from outside the data storage system, indicating availability of information about a flaw in a data storage device. It should be noted that information about the flaw that is sent to the data storage system may be "notification indicating availability of the information." The information about the flaw may be stored in a memory associated with the data storage system. The information may be automatically fetched from the data storage device, and the information about the flaw and the information about the installed data storage device may be used to identify the installed data storage device as being flawed, in response to installation of the data storage device in the data storage system.

The flaw may involve: an incompatibility between the data storage system and a user computer communicability coupled to the data storage system, or an incompatibility between the data storage system and a network interface device external to the data storage system.

Other embodiments of the present invention provide data storage systems configured to perform the operations described herein. For example, one such embodiment provides a data storage system that includes two or more bays. Each bay may be configured to user-swappably receive a data storage device. That is, a user may install a data storage device in the bay. A data storage controller is coupled to the bays and is configured to manage the data storage devices installed in the bays. The data storage system also includes a communication port coupled to the data storage controller. The data storage controller is configured to automatically fetch information about the installed data storage devices from the plurality of data storage devices. For example, the data storage controller may read make, model and version information from non-volatile memory in each installed data storage device. Using the data communication port, the data storage controller automatically obtains information about a flaw in a data storage device. This data may be obtained from outside the data storage system, such as from a data storage device flaw information server (described below). Using the information about the flaw and the information about one of the installed data storage devices, the data storage controller may automatically identify the installed data storage devices as being flawed.

Another embodiment of the present invention provides a data storage device flaw information server. The server includes a computer network port and a database configured to store information about data storage devices having respective flaws. The database information may include information usable to automatically identify each of the data storage devices. A processor may be coupled to the computer network port and to the database. The processor may be programmed to automatically receive, via the computer network port, from a first external system, information about a data storage device that has a flaw. The received information may include information usable to automatically identify the data storage device. The processor may store the received information in the database and fetch, from the database, information about a data storage device having a flaw, including information usable to automatically identify the data storage device having the flaw. The processor may further provide the fetched information, via the computer network port, to a second external system. For example, a fix data server may include an interface to allow manufacturers to add and/or correct fix data stored therein.

The information from the first external system about the data storage device may include firmware for correcting the flaw in the data storage device. The processor may be further programmed to fetch and provide the information about the data storage device having the flaw in response to a request from the second external system. The processor may be further programmed to receive, via the computer network port, information identifying a data storage system having a data storage device installed therein, including information identifying the data storage device installed in the data storage system.

The processor may be further programmed to query the database for information about a data storage device that has a flaw and that corresponds to the information identifying the data storage device installed in the data storage system. If the query is successful, the processor may provide the information about the data storage device having the flaw to the data storage system or to a computer associated with the data storage system. The processor may be programmed to perform the query in response to receiving the information identifying the data storage system and/or in response to receiving the information about the data storage device having the flaw.

Another embodiment of the present invention provides a data storage device flaw information server that provides flawed data storage devices to external data storage systems. An exemplary external data storage system is configured such that the data storage devices can be user-swappably installed in the data storage system. Such a server includes a computer network port and a database configured to store information about data storage devices having respective flaws. The stored information may include information usable to automatically identify each of the data storage devices. A processor is coupled to the computer network port and to the database and is configured to automatically fetch information, from the database, about a data storage device having a flaw, including information usable to automatically identify the data storage device having the flaw. The processor is also configured to provide the fetched information, via the computer network port, to an external data storage system.

Yet other embodiments of the present invention provide methods for receiving and storing information about flaws and data storage devices and for providing such information to external system, as described herein.

An additional embodiment of the present invention provides a computer program product for use on a computer system. The computer program product may include a computer-readable medium on which are stored computer instructions for causing a processor to perform one or more of the methods described herein.

For example, an embodiment provides a computer readable medium having computer readable program code stored on it for automatically identifying a flawed data storage device installed in a data storage system. The data storage system may be configured to manage two or more user-swappable data storage devices installed in it. The computer readable program code includes program code for obtaining information from outside the data storage system about a flaw in a data storage device. The program code causes a processor to fetch information from a data storage device installed in the data storage system. The information includes information about the installed data storage device, such as make, model and revision level. Using the information about the flaw and the information about the installed data storage device, the processor automatically identifies the installed data storage device as being flawed. The program code may be executed by a "dashboard" application program or by the data storage system.

Another embodiment provides a computer readable medium having computer readable program code stored on it for automatically managing a data storage system. The data storage system has at least two user-swappable data storage devices installed in it. The computer readable program code includes program code for interrogating the data storage system to obtain information about the data storage devices installed in it. In addition, information is obtained from outside the data storage system about a flaw in a data storage device, and at least one of the installed data storage device is identified as being flawed.

Another embodiment of the present invention provides a data storage system having a data storage controller and at least one data storage device. The data storage controller may be configured to interrogate the data storage devices, to obtain flaw information from a remote server, to identify flaws, to notify a user (and optionally a dashboard application program), and to repair the problem.

Yet another embodiment of the present invention provides a dashboard application program configured to interrogate a data storage system and its data storage devices, to obtain flaw information from a server, to identify flaws, to notify a user, and to repair the problem.

Another embodiment of the present invention provides a server configured to store flaw information, to receive information regarding a data storage system and its data storage devices, and to provide flaw information related to the data storage devices.

BRIEF DESCRIPTION OF THE DRAWINGS

The invention will be more fully understood by referring to the following Detailed Description of Specific Embodiments in conjunction with the Drawings, of which:

FIG. 2 is a schematic block diagram of exemplary fields in a record used in a problem identification database shown in FIG. 1, according to an embodiment of the present invention;

FIG. 3 is a schematic block diagram of exemplary fields in a record in a problem fix database shown in FIG. 1, according to an embodiment of the present invention;

DETAILED DESCRIPTION OF SPECIFIC EMBODIMENTS

Exemplary embodiments include methods and apparatus for automatically identifying certain types of data storage system problems such as, for example, a flawed storage device or an incompatibility between a storage system and a storage device or an incompatibility between the storage system and a user computer. The existence of such a problem may be highlighted to a user, for example, through an indicator on the storage system and/or through a "dashboard" application being executed by the user computer, and the problem may be automatically corrected, for example, by automatically downloading a fix (e.g., new firmware or a "patch") from a server (e.g., a server managed by the storage device manufacturer, a server managed by the storage system manufacturer and/or a server managed by a third party) and automatically implementing the fix. Additional embodiments are disclosed for storing information about flaws in storage devices, for automatically receiving additional flaw information and storing the information in a database, for providing such information to data storage systems or their associated user computers, and for remotely identifying and correcting flaws in data storage systems.

Figure 1:
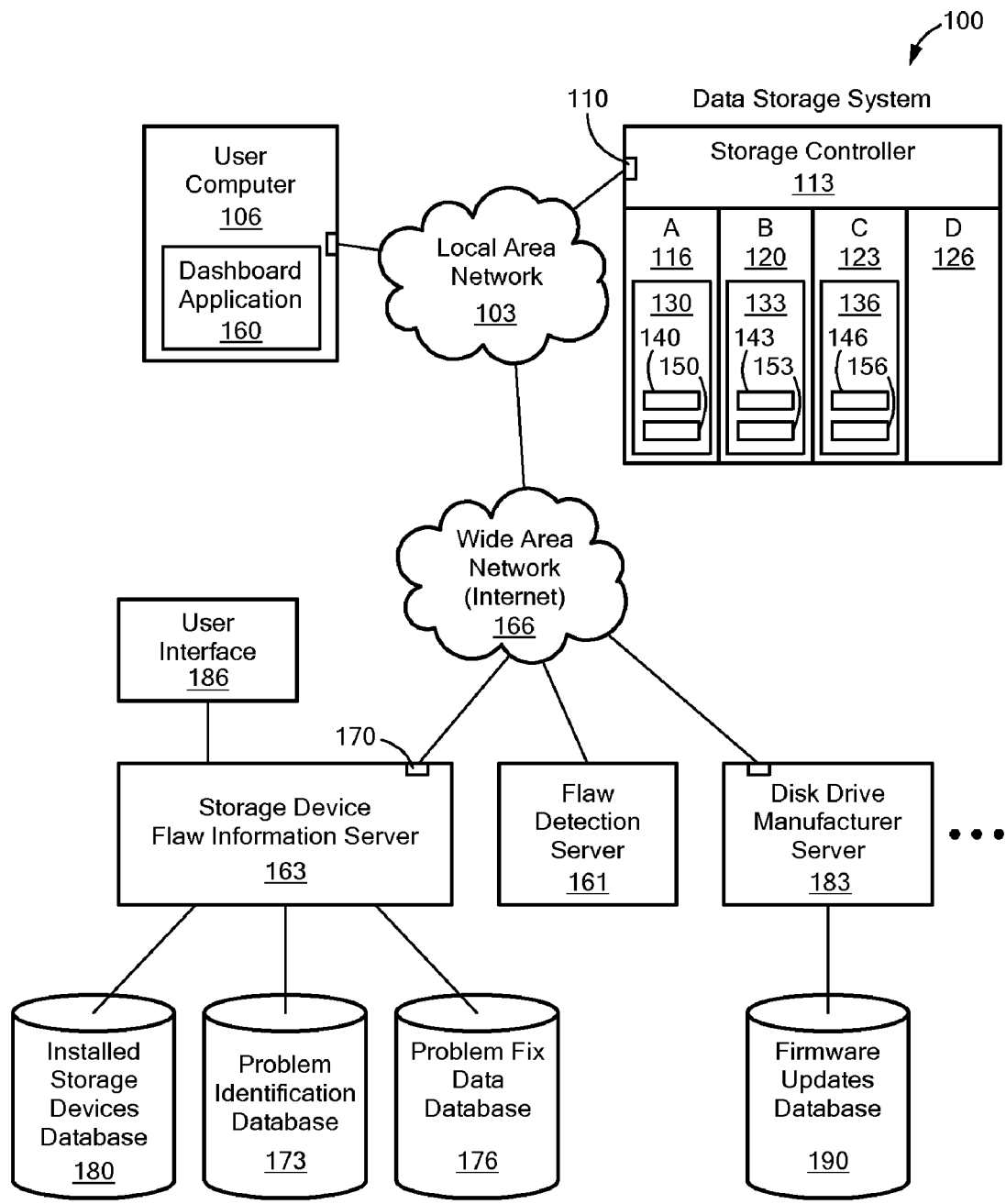
FIG. 1 is a schematic block diagram of an exemplary context in which embodiments of the present invention may be used.

FIG. 1 is a schematic block diagram of an exemplary context in which embodiments of the present invention may be used. A data storage system 100 is connected via a local area network 103 to a user computer 106. As shown in FIG. 1, the connection may be made via a network interface 110 in the data storage system 100. Alternatively, the connection may be made via a USB interface, a Firewire interface or any other suitable data interface and connection (not shown). The connection may include an intermediate device, such as a DroboShare™ network interface, available from Data Robotics, Inc., Santa Clara, Calif.

The data storage system 100 includes a storage controller 113, which includes a processor and control software, firmware and/or middleware. The storage controller 113 controls operation of the data storage system 100. The user computer 106 may store data in the data storage system 100, and the data storage system 100 may provide data to the user computer 106, in a well-known manner. In addition to controlling data storage and communication with the user computer 106, the storage controller 113 also performs functions related to detecting and correcting flaws and notifying the user, as described herein.

The data storage system 100 includes a number of bays or slots 116, 120, 123 and 126, into which respective storage devices, such as disk drives, may be swappably installed. In the example shown in FIG. 1, three storage devices 130, 133 and 136 are installed in three bays 116-123. Other data storage systems may include other numbers of bays, and other numbers of storage devices may be installed in the data storage systems, depending on user needs, budget and other considerations.

Each storage device 130-136 includes firmware 140, 143 and 146 stored in the storage device. The firmware 140-146 may be stored in nonvolatile memory or any other suitable memory. Data and instructions in the firmware 140-146 are used by the respective storage devices 130-136 to control operation of the storage devices.

Over time, a manufacturer may develop successive versions of firmware for a given model of storage device. Similarly, the manufacturer may develop successive versions of other components of a given storage device. For example, successive versions of the storage device may include different hardware components, such as mechanical, electronic or electromechanical components or subassemblies.

Flaws

As noted, a released version of a storage device may include one or more flaws. For example, a released version of firmware may include incorrect data or instructions. A version of a storage device may include hardware components that are found or suspected to be faulty, unreliable, dangerous or otherwise inappropriate. In some cases, a hardware component may be mismatched with another component or with a certain firmware version.

Firmware in a storage device or software in a storage controller may be found to be incompatible with software (such as an application program, a device driver or an operating system) being executed by a user computer. The firmware or software may be found to be incompatible with a network device that handles traffic between a data storage system and a user computer or with another component with which the data storage system communicates. Similarly, firmware or a hardware component in a storage device may be found to be incompatible with control software or hardware in a data storage system.

Some storage devices, data storage systems and user computers are configurable, such as by software (for example through the use of parameters, registry settings, etc.) or by hardware (for example through the use of switch settings, option jumpers, etc.). Some such configuration settings may be made by end users, and other configuration settings are accessible only by equipment manufacturers or repair depots. In any case, a storage device or a data storage system may be configured in a way that is incompatible with a user computer, or a storage device may be configured incompatibly with the data storage system.

Some flaws may manifest themselves when the storage device is used in any context. Other flaws may manifest themselves only when the storage device is used in certain contexts, such as when accepting or providing data to certain types of computer systems or at or above a certain data rate. In general, a "flaw" is a known hardware, software or firmware version or configuration of a storage device that prevents the storage device from meeting desired design, performance, safety or reliability characteristics or that otherwise may impact an intended use of the storage device.

Each storage device 130-136 stores information 150, 153 and 156 that identifies the storage device. This information 150-156 may be stored on a disk platter, in a read-only memory (ROM), in nonvolatile memory or by any other suitable memory or circuit. The information 150-156 may, but need not, be stored in the same memory that stores the firmware 141-146. The identification information 150-156 may include the name of a manufacturer ("make") that produced the storage device, model number, part number, hardware revision level, firmware version number or other information that may be used to identify the storage device and distinguish it from other makes and models of storage devices, as well as from similar (i.e., the same make and model number) storage devices having different hardware or firmware revision levels or configurations. The identification information 150-156 may be stored as binary data, string data, switch settings or in any other controller-readable format. Each storage device 130-136 makes the stored information 150-156 available for reading, such as by the storage controller 113.

The user computer 106 executes a dashboard application 160, which communicates with the storage controller 113 and displays status information about the data storage system 100. For example, the dashboard application 160 may display the amount of storage space that is in use, and the amount of storage space that is available for use, on the storage devices 130-136. If a flaw is discovered in one of the storage devices 130-136, information about the flaw may be displayed by the dashboard application 160, as will be described in more detail below.

Flaw Detection

In general, the data storage system 100, the dashboard application 160 or a flaw detection server 161 may detect a flaw in a storage device 130-136 installed in a data storage system 100 or a flaw in the data storage system 100 itself (A device that is capable of detecting such errors is referred to as "flaw detector.") A flaw detector may request information about known flaws from a server 163 configured to provide such information. Optionally or alternatively, information about flaws may be "pushed" to the flaw detector. The flaw detector may use flaw information about only the storage devices 130-136 that are currently installed in the data storage system 100, or the flaw detector may store flaw information about additional storage devices, in case any of these storage devices is subsequently installed in the data storage system 100.

The flaw detector may periodically or occasionally obtain information from one or more storage devices 130-136 installed in the data storage system 100 and use this information to ascertain if a flaw is present. For example, the flaw detector may compare version numbers of the firmware 140-146 resident in the storage devices 130-136 to a list of problematic firmware version numbers in the flaw information. The flaw detector may check for flaws in response to a command from a user, according to a schedule or in response to an event, such as installation of a storage device in the data storage system 100 or receipt of flaw information from the server 163.

The flaw detector may display information about a detected flaw, such as by lighting an indicator on a front panel of the data storage system 100, by displaying information about the flaw and/or user instructions for correcting the flaw on the dashboard application 160 or by sending a message (such as an e-mail message). The flaw detector may automatically correct the flaw, such as by downloading replacement firmware from a server 163 or 183 and then installing the replacement firmware in the flawed storage device.

Storage Device Flaw Information Server

The data storage system 100 is communicatively coupled to the storage device flaw information server 163. The data storage system 100 may communicate directly with the information server 163, or the communication may be relayed by the dashboard application 160 or by another component (not shown) within the user computer 106 or another component (not shown) that is connected to the local area network 103. The communication may be carried over any suitable wide area network 166, such as the Internet. The storage device flaw information server 163 includes a network interface 170. For simplicity, additional communication components, such as routers, switches and firewalls, are omitted from FIG. 1.

The storage device flaw information server 163 includes a problem identification data base 173. This database 173 stores information about known flaws in storage devices, along with information that may be used by the data storage system 100 to automatically identify the flawed storage devices. FIG. 2 is a schematic block diagram of exemplary fields in a record 200 in the problem identification data base 173. The record 200 may include the following fields: make 203 (such as "Seagate"); model number 206 (such as "ST31500341AS"); part number 210 (such as "9JU138-300"); firmware version 213 (such as "SD1A"); and other information 216 that may be used to automatically identify the corresponding storage device. For example, the other information 216 may include diagnostic instructions, such as a script, that may be executed by the data storage system 100 to identify a flawed storage device. The instructions may be executed directly by a processor, or the instructions may be interpreted by software being executed by the processor, i.e., the instructions may be machine instructions, a script, non-procedural instructions (tags), etc. The record 200 also includes a problem identification field 220, which may be a number or other code associated with a particular flaw.

Returning to FIG. 1, the storage device flaw information server 163 also includes a problem fix database 176. The problem identification field 220 (FIG. 2) may be used as a key to access the problem fix database 176. FIG. 3 is a schematic block diagram of exemplary fields in a record 300 in the problem fix database 176. The record 300 may include the following fields: problem identification 303 (key field); flags 306 (such as to indicate a type of fix); corrective firmware 310 or a pointer (such as a URL) to a location where such corrective firmware may be stored; instructions 313 (such as a script) that may be executed to correct the flaw; text or graphics 316 to be displayed to a user to explain the flaw or to explain how to correct the flaw; and return material authorization ("RMA") information 320 to enable a user to return a flawed storage device for repair or to exchange it for a replacement unit.

Returning again to FIG. 1, the storage device flaw information server 163 may also include an installed storage devices database 180. Although not shown in FIG. 1, other data storage systems, with other storage devices installed in them, and other user computers may be connected via the wide area network 166 to the storage device flaw information server 163. The installed storage devices database 180 may contain information about the storage devices that are installed in the respective data storage systems. The database 180 may contain a record for each known storage device installed in a data storage system.

Figure 4:
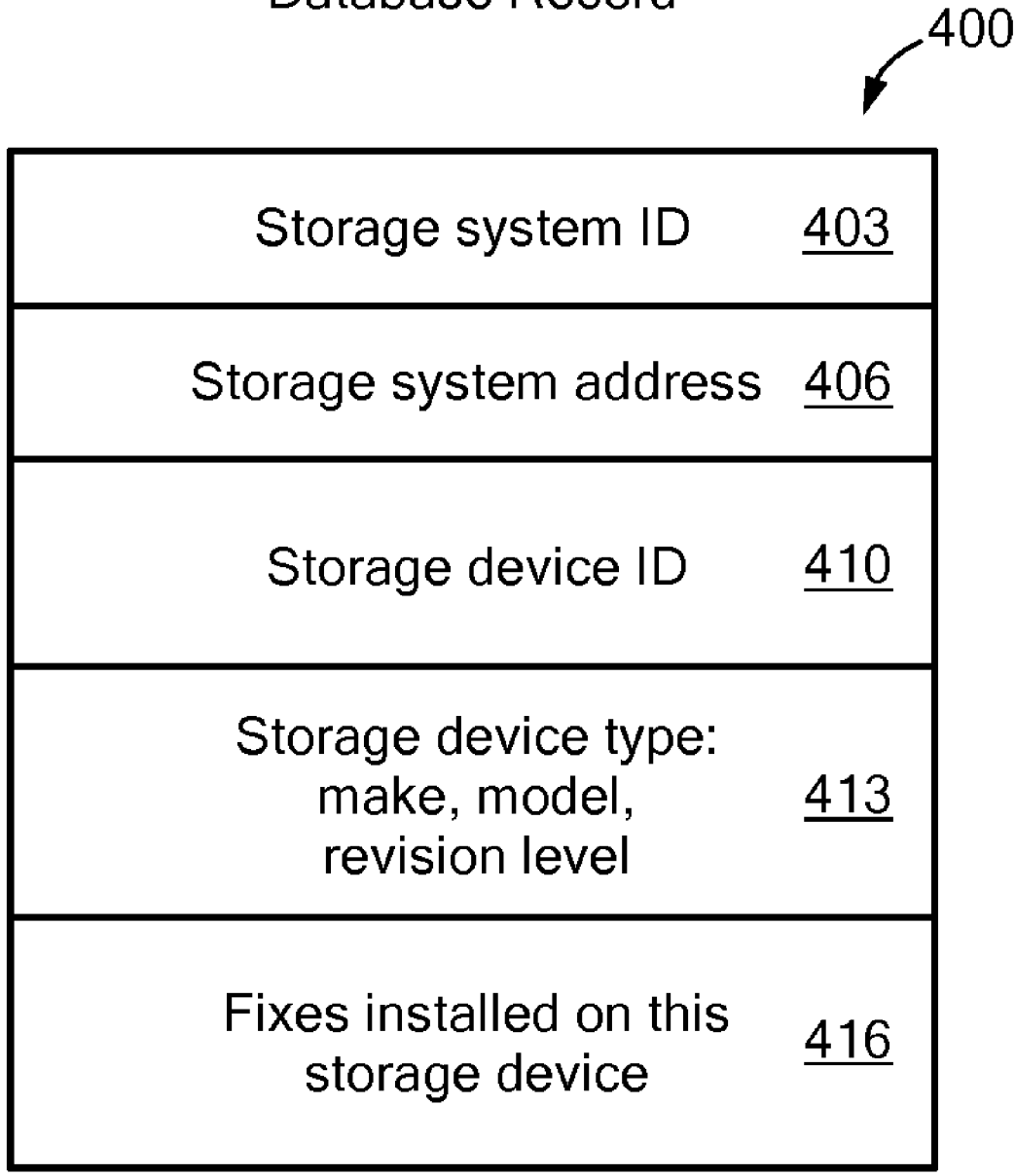
FIG. 4 is a schematic block diagram of exemplary fields in a record in an installed storage devices database shown in FIG. 1, according to an embodiment of the present invention.

When a storage device is installed in a data storage system, the data storage system or its associated dashboard application may send information to the storage device flaw information server 163 to identify the newly installed storage device, and the server 163 may store this information in the database 180. FIG. 4 is a schematic block diagram of exemplary fields in a record 400 in the installed storage devices database 180. The record 400 may include the following fields: storage system identification 403 that uniquely identifies the data storage system 100; storage system address 406 (such as a URL or a path or sequence of URLs) by which the storage device flaw information server may send messages to the data storage system 100; storage device identification 410 that uniquely identifies the storage device within the data storage system; storage device type 413 (which may include information such as make, model number, part number and firmware version); and a list 416 of fixes that have been installed or performed on the storage device.

Returning once again to FIG. 1, the storage device flaw information server 163 may receive storage device flaw information from another system, such as a disk drive manufacturer server 183. Optionally or alternatively, the storage device flaw information server 163 may include a user interface 186, by which an administrator may enter or revise data in any of the databases 173, 176 or 180.

Each disk drive manufacturer may maintain its own disk drive manufacturer server 183 or one such server may be used to store information about storage devices produced by a number of manufacturers. The server 183 may send information about a flaw, such as some or all of the information described above with reference to the problem identification database record 200 (FIG. 2) and some or all of the information described above with reference to the problem fix database record 300 (FIG. 3). Once the storage device flaw information server 163 receives this information, the information server 163 may store portions of this information in the problem identification database 173 and in the problem fix database 176. Each such manufacturer's server 183 may include a firmware updates database 190, which stores firmware for the manufacturer's disk drives. The disk drive manufacturer server 183 may send information about one or more flaws on a periodic basis, when additional information is added to the firmware updates database 190, when manually triggered to do so through a user interface (not shown) or as a result of another suitable trigger.

The storage device flaw information server 163 may provide information about flaws to data storage systems in a "push" or in a "pull" mode. In the push mode, periodically or when the storage device flaw information server 163 receives and stores information about a new flaw, the information server 163 may send this information to one or more data storage systems 100, such as data storage systems that have registered with the information server 163 to receive this information. The information may be sent to all the data storage systems 100 that are listed in the installed storage devices database 180 or to a subset of these data storage systems 100. For example, the information may be sent to only those data storage systems 100 that currently have storage devices installed on them that have the new flaw referenced in the received information.

In the pull mode, the storage device flaw information server 163 responds to requests from data storage systems 100 for information about flaws. For example, when a new storage device is installed in a bay of a data storage system 100, the storage controller 113 detects the installation and reads information, such as make, model number, part number and firmware version, from the newly installed storage device. The data storage system 100 sends this information to the storage device flaw information server 163, along with a request for information about flaws in the newly installed storage device. If the problem identification database 173 contains information about the newly installed storage device, i.e., the newly installed storage device is flawed, the storage device flaw information server 163 fetches information about the flaw from the problem fix database 176 and from the problem identification database 173 and sends the information to the requesting data storage system 100.

Figure 7:
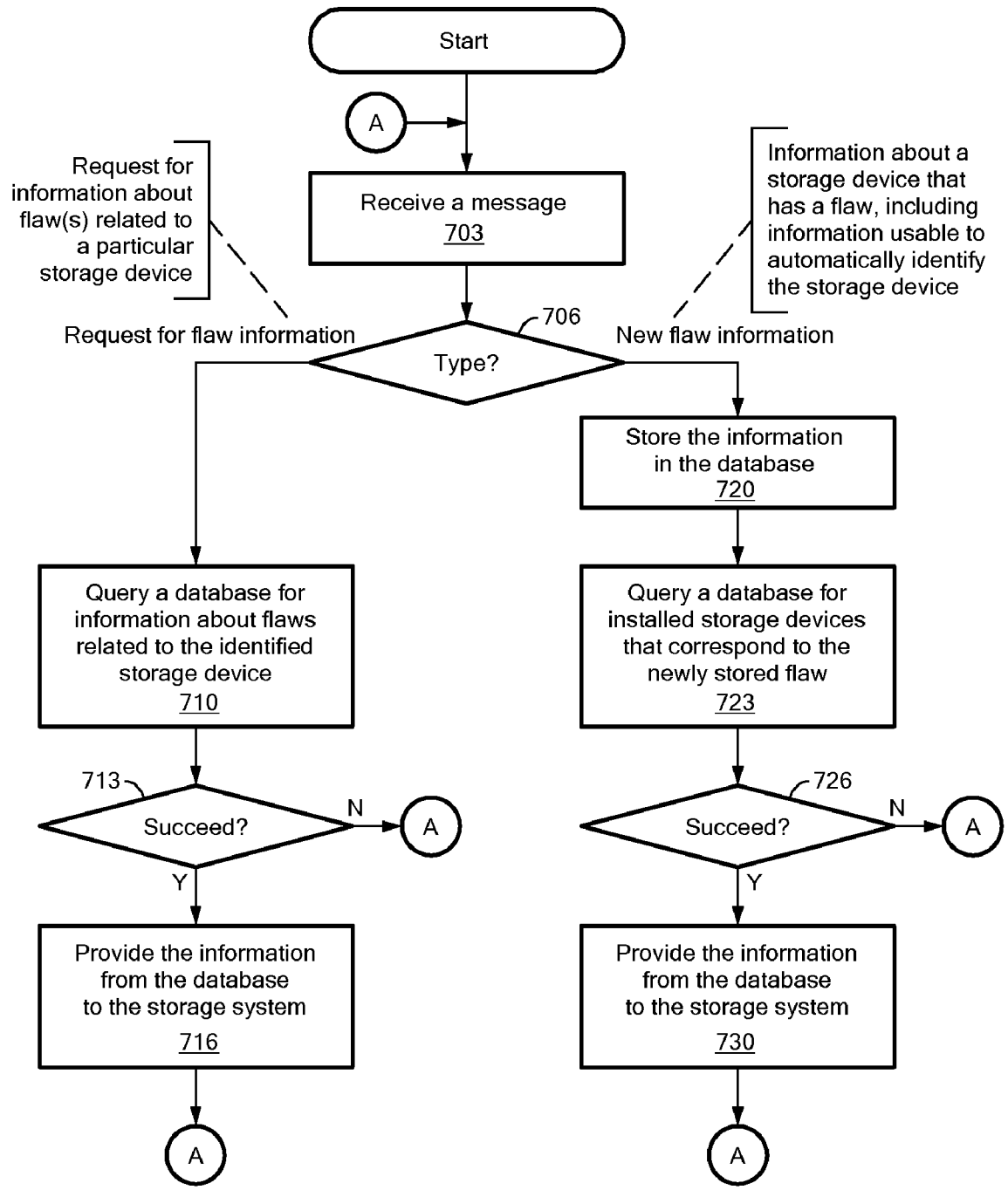
FIG. 7 contains a flowchart summarizing operations performed by a storage device flaw information server, in accordance with embodiments of the present invention.

FIG. 7 contains a flowchart that summarizes operations performed by the storage device flaw information server 163, according to some embodiments of the present invention. At 703, the server 163 receives a message, and at 706 control is transferred to one of two branches, depending on the message's type.

If the message is from a data storage system 100, control passes to 710. The message may be a request for information about flaws related to a particular storage device, such as a storage device that has just been installed in the data storage system 100. In this case, the message includes information about the device, such as make, model number, firmware version number, etc.

Optionally, the storage device flaw information server 163 stores information about the storage device, as well as information about the data storage system 100, in the installed storage devices database 180. That is, an installed storage devices database record 400 (FIG. 4) is generated and stored in the database 180.

At 710, the information server 163 queries the problem identification database 173 for information about flaws related to the storage device identified in the message from the data storage system 100. If the query returns any matching records, control passes from 713 to 716. At 716, the storage device flaw information server 163 sends a message to the data storage system 100 with the information retrieved from the problem identification database 173, i.e. information from one or more matching problem identification database records 200 (FIG. 2), as well as any related problem fix database records 300 (FIG. 3).

Returning to operation 706, if the message received by the storage device flaw information server 163 is from the disk drive manufacturer server 183, the message may contain information about a storage device that has a flaw ("a newly identified flaw"). Control passes to 720, where this information (see the problem identification database record 200 in FIG. 2) is stored in the problem identification database 173. If the message contains information about correcting the flaw, this information (see the problem fix database record 300 in FIG. 3) is stored in the problem fix database 176.

One or more data storage systems 100 may have previously notified the storage device flaw information server 163 of storage devices that are installed in the data storage systems. If so, information about these storage devices was stored in the installed storage devices database 180. At 723, the installed storage devices database 180 is queried for installed storage devices that correspond to the newly identified flaw. If the query succeeds, control passes from 726 to 730. At 730, information about the newly identified flaw, as well as any other flaws related to the storage device that are reflected in the problem identification database 173, is sent to the data storage system 100.

Data Storage System

Figure 5:
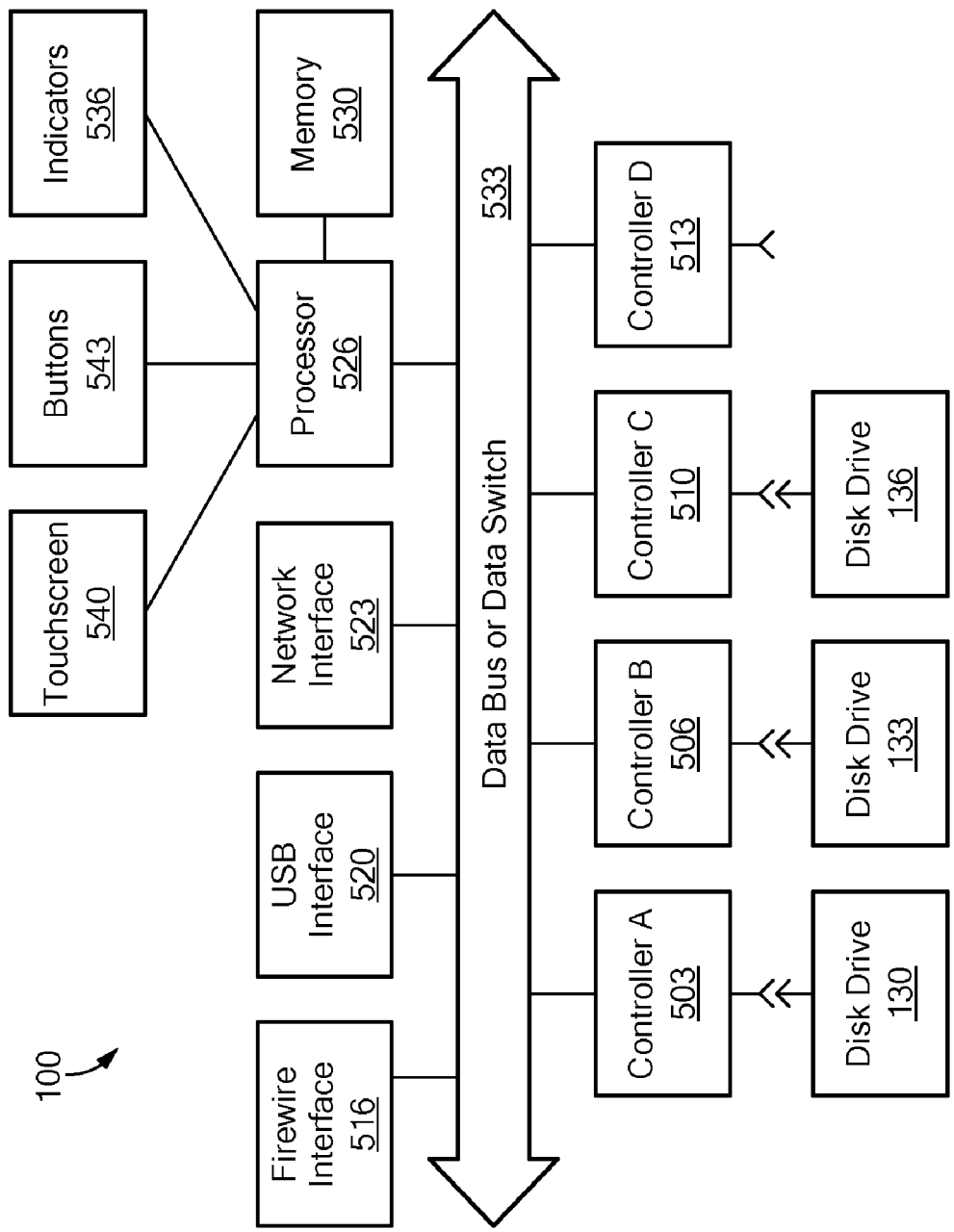
FIG. 5 is a schematic block diagram of a data storage system, according to an embodiment of the present invention.

FIG. 5 is a schematic block diagram of one embodiment of the data storage system 100. The data storage system 100 includes controllers 503, 506, 510 and 513, one controller for each bay 116-126 (FIG. 1). The storage devices 130-136 swappably couple with their respective controllers 503-510, as is well known in the art. The data storage system 100 includes one or more interfaces, such as a Firewire interface 516, a USB interface 520 and/or a network interface 523, by which the data storage system 100 may be communicatively coupled to the user computer 106 (FIG. 1) and, via the wide-area network 166, to the storage device flaw information server 163.

A processor 526 executes instructions stored in a memory 530 to control operation of the data storage system 100. Collectively, the processor 526, the memory 530 and the instructions stored in the memory 530 may form all or part of the storage controller 113 (FIG. 1). A data bus or a data switch 533 interconnects the processor 526 and the other major subsystems of the data storage system 100.

The processor 526 controls indicators 536, such as light-emitting diodes (LEDs), to indicate which bays 116-126 have storage devices 130-136 installed in them and, according to a color and blink code, to indicate statuses of the respective installed storage devices 130-136. For example, a steady green light may indicate that an installed storage device is operating correctly and that the storage device may be removed from the data storage system 100, whereas an alternating green and yellow light may indicate that transfer activity is in progress and that the storage device should not be removed until the activity has completed. A blinking yellow light may indicate that the data storage system 100 has identified a flaw associated with the storage device.

The processor 526 may display text or graphics on a touch-screen 540 to display status information, such as an amount of storage space remaining on the storage devices 130-136 or information about a flaw in one of the storage devices. The touchscreen 540 and/or buttons 543 enable a user to interact with the storage controller 113. For example, a user may acknowledge having read a message that was displayed by the processor 526 on the touchscreen 540, or the user may select one of several menu options displayed on the touchscreen 540.

Figure 6A:
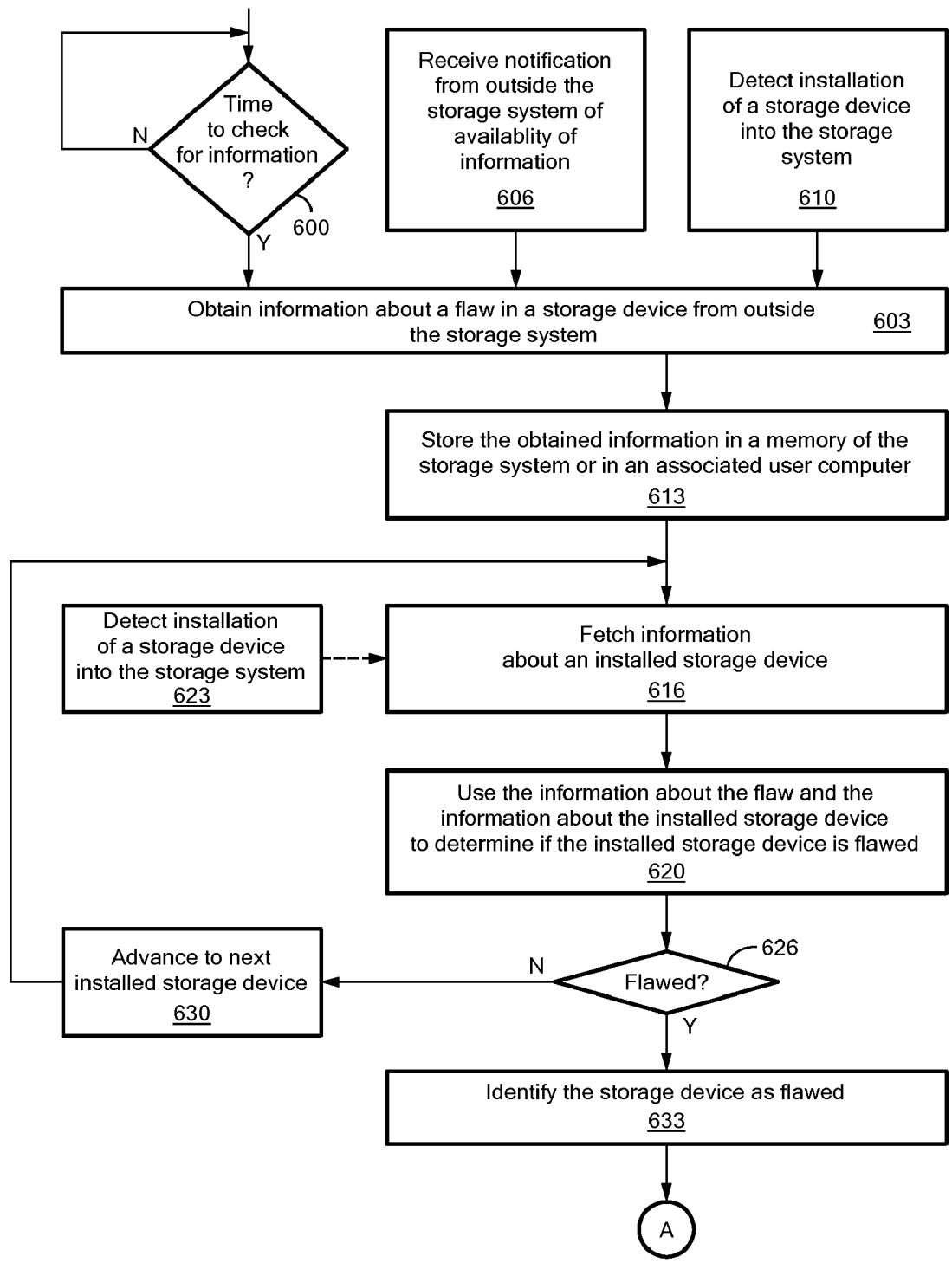
FIGS. 6A-6C contain a flowchart summarizing operations performed by a data storage system, in accordance with embodiments of the present invention.
Figure 6B:
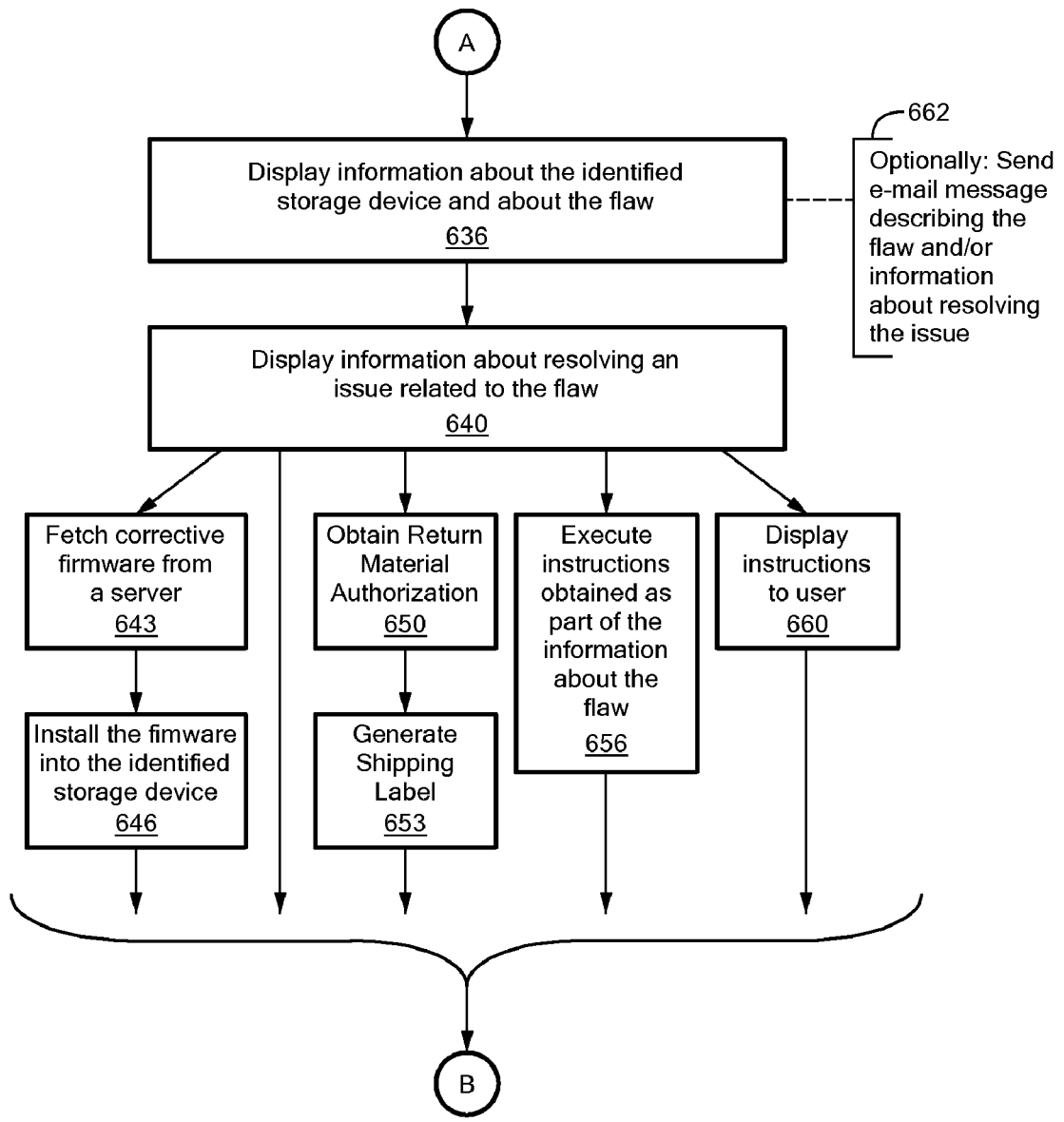
Figure 6C:
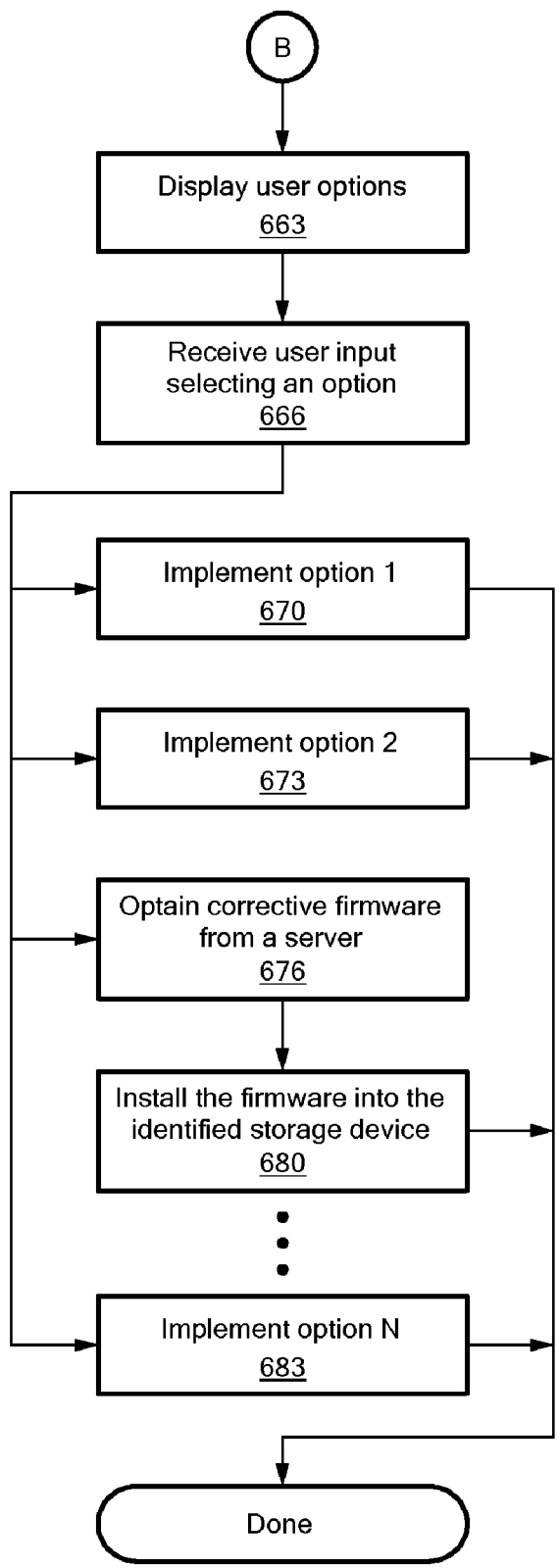

As noted, the data storage system 100 may automatically identify a flawed storage device installed in the storage system and may automatically correct the flaw. FIGS. 6A-6C contain a flowchart summarizing these operations, in accordance with some embodiments of the present invention. Various events may trigger the data storage system 100 to check the storage devices 130-136 installed in the data storage system 100 for flaws. These events include (without limitation): the passage of time, installation of a new storage device into the data storage system 100 and receipt of notification from outside the data storage system 100 (such as from the storage device flaw information server 163) that flaw-related information is available. Some paths through the flowchart of FIG. 6 represent operations performed as a result of one or more of these events. Some embodiments include one or more of these paths. Thus, some of the operations depicted in FIG. 6 may be absent from some embodiments.

The data storage system 100 may periodically or occasionally check for the availability of information about flaws in storage devices. For example, the data storage system 100 may check at a predefined or user-specified interval or time, such as once per day or once per week (without necessarily specifying a time of day) or every Friday at 2 a.m. As used herein, a "predetermined schedule" does not necessarily require fixed times. Such a schedule could be daily, weekly, etc., without specifying a particular time each day, week, etc. At 600, if it is time (according to the predetermined schedule)

to check for information, control passes to 603. Otherwise, control passes to a routine that waits for a later time or for detection of another event.

The check for the availability of information about flaws may be triggered by an asynchronous event, such as installation of a new storage device into the data storage system 100 or receipt of a message from outside the data storage system 100. At 606, a notification of the availability of flaw-related information is received from outside the data storage system 100, such as from the storage device flaw information server 163. At 610, the data storage system 100 detects installation of a storage device into one of the bays 116-126. Some embodiments of the present invention implement one, some or all of the operations described with reference to 600, 606 and 610.

As a result of the occurrence of either event 606 or 610, or a positive determination of the condition 600, at 603 the data storage system 100 obtains (or at least attempts to obtain) information about a flaw in a storage device from outside the storage system.

If it is time to check for information (600), the data storage system 100 sends a message to the storage device flaw information server 163 requesting information about flaws in storage devices that are currently installed in the data storage system 100. Optionally, the message may request information about flaws in other storage devices, i.e., ones not currently installed. At 613, information received from the storage device flaw information server 163 is stored in the memory of the data storage system 100 or elsewhere, such as in the associated user computer 106.

If a notification of the availability of flaw-related information is received from outside the data storage system 100, and the notification includes the flaw-related information, the received information is stored at 613. However, if the notification does not include flaw-related information, the data storage system 100 sends a message to the storage device flaw information server 163 requesting information about flaws in the storage devices that are currently installed in the data storage system 100. Optionally, the message to the flaw information server 163 may request information about flaws in other storage devices, i.e., ones not currently installed. In either case, information received from the storage device flaw information server 163 is stored at 613.

If the data storage system 100 detects installation of a storage device, the data storage system 100 sends a message to the storage device flaw information server 163 requesting information about flaws in the newly installed device. Information received from the storage device flaw information server 163 is stored at 613.

At 616, information about an installed storage device is fetched from the storage device. For example, the information about make, model number, part number, firmware version number, etc. 150 (FIG. 1) stored in the storage device 130 may be read by the storage controller 113 to ascertain which storage device is installed in the first bay 116 of the data storage system 100.

At 620, the fetched information about the installed storage device 130 and the information (stored at 613) about the flaw are used to determine if the installed storage device 130 is flawed. That is, the information about the flaw is compared to the information (such as make, model number and firmware version number) about the installed storage device 130. If the flaw information matches the storage device information, the storage device 130 is determined to be flawed. In some cases, the problem identification database record 200 (FIG. 2) includes diagnostic instructions, such as a script, in a field 216 (FIG. 2) that may be executed to determine if the storage device is flawed. In these cases, the storage controller 113 causes the diagnostic instructions to be executed.

In some embodiments, information about flaws related to storage devices that are not currently installed in the data storage system 100 is, nevertheless, stored at 613. In these cases, when a storage device is installed in the data storage system 100, the previously stored flaw-related information may be immediately examined, i.e., without necessarily communicating with the flaw information server 163, to determine if the newly installed storage device is flawed. Thus, at 623, when a newly installed storage device is detected, control passes to 616.

At 626, if the storage device is not determined to be flawed, control passes to 630, which advances to the next installed storage device, and control returns to 616. Thus, a loop of operations 616, 620, 626 and 630 may be performed once for each installed storage device 130-136 that is not determined to be flawed. On the other hand, at 626, if one of the storage devices is determined to be flawed, control passes to 633 where the storage device is so identified for further processing.

Figure 8:
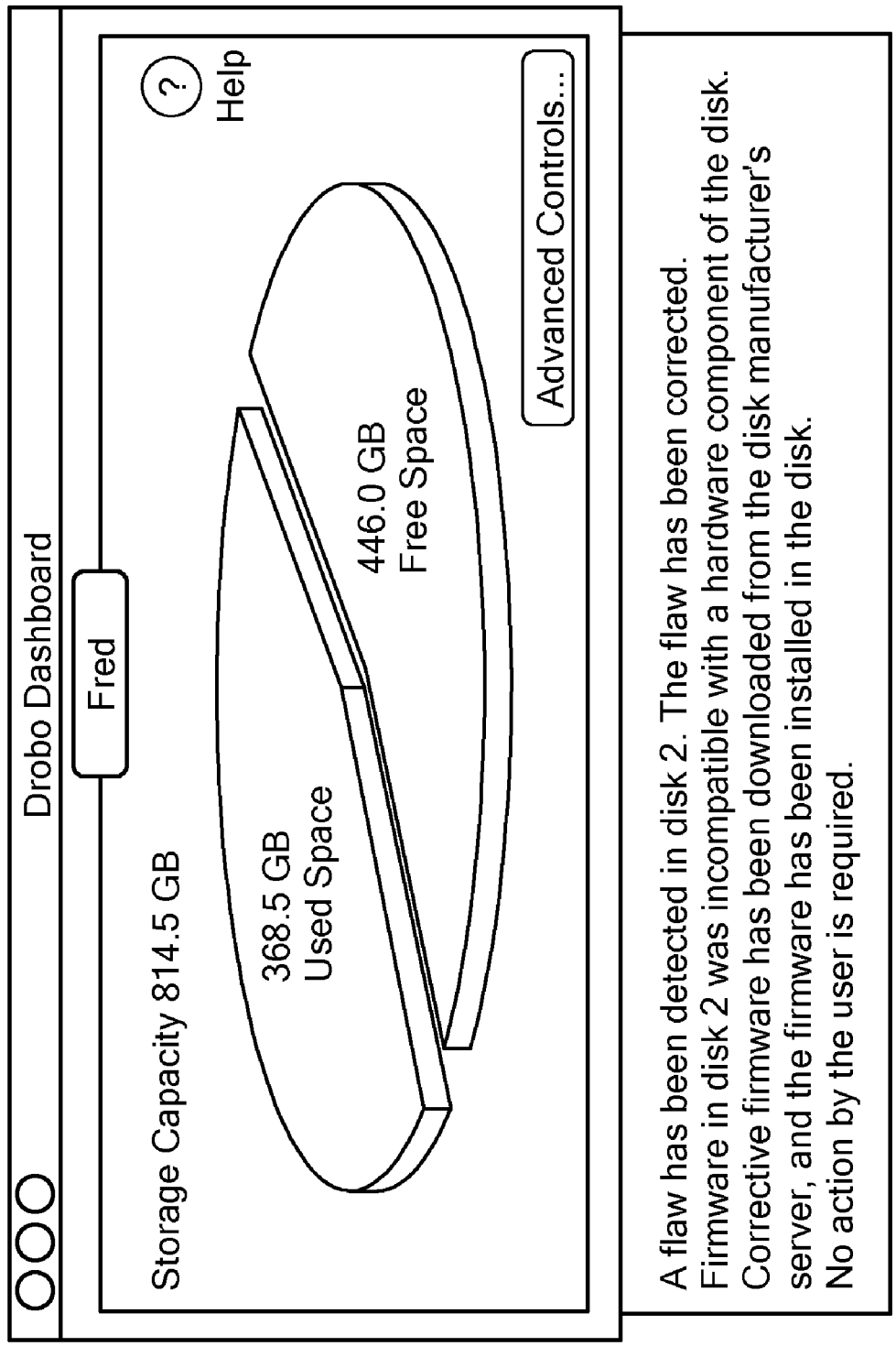
FIG. 8 illustrates an exemplary user interface display of information about an identified flaw, in accordance with embodiments of the present invention.

At 636, information about the identified (flawed) storage device and about the flaw may be displayed, such as on the touchscreen 540 (FIG. 5). Optionally or alternatively, an indicator 536 (FIG. 5) associated with the flawed storage device may be activated or its state (such as its color or blink code) may be changed. Optionally or alternatively, the information about the flaw may be displayed by the dashboard application 160 being executed on the user computer 106. In some embodiments, displaying information about the flawed storage device and a flaw is postponed until after the flaw has been corrected. FIG. 8 illustrates an exemplary display of information about an identified flaw.

Returning to FIG. 6, at 640, information about resolving an issue related to the detected flaw may be displayed on the touchscreen 540 (FIG. 5) and/or by the dashboard application 160 (FIG. 1). In some embodiments, instructions for resolving the issue are displayed to a user or the user is presented with a menu of issue resolution choices. These embodiments are described later. In some of these and in other embodiments, the storage controller 113 (FIG. 1) automatically selects an approach to resolving the issue. Flags stored in a field 306 (FIG. 3) of the problem fix database record 300 may be used to indicate a type of approach that may be used to resolve the issue. For example, one flag may indicate that corrective firmware is available and that installing the corrective firmware will resolve the issue. Another flag or flags may indicate where the corrective firmware is stored, such as in the problem fix date database 176 and/or on the disk drive manufacturer server 183. Other flags may indicate: the storage device must be returned for repair or replacement; the storage device should be restarted or power-cycled after installation of corrective firmware; a script or other executable instructions (such as a script stored in the problem identification database record 200 (FIG. 2) or in the problem fix database record 300 (FIG. 3)) should be executed to diagnose and/or correct the flaw, etc. Some representative approaches are shown in FIG. 6.

For example, if the flaw can be corrected by installing corrective firmware, which may be additional firmware or a new version of firmware that is currently installed in the storage device, at 643 the data storage system 100 fetches the corrective firmware from a server. The corrective firmware may be stored in the problem fix database 176 (FIG. 1) or in the firmware updates database 190 or elsewhere. As noted, field 310 (FIG. 3) of the problem fix database record 300 may contain the corrective firmware or a pointer to the corrective firmware. The storage controller 113 (FIG. 1) in the data storage system 100 sends a message to the respective server 163 or 183 or elsewhere requesting the corrective firmware. After the data storage system 100 receives the corrective firmware, at 646 the storage controller 113 installs the corrective firmware into the storage device and restarts the storage device (if necessary), thus automatically correcting the flaw.

In some cases, the flawed storage device should be returned to its manufacturer or it should be sent to a repair depot for repair or replacement. At 650, the storage controller 113 (FIG. 1) obtains return material authorization ("RMA") from the manufacturer or repair depot. The storage controller 113 sends a message to the disk drive manufacturer server 183 or to another server (not shown) requesting the RMA. The message may include the flawed storage device's make, model number, serial number, etc.

The data storage system 100 (FIG. 1) or the dashboard application 160 may already store information about the user, such as the user's name and address. For example, this user information may have been solicited from the user and stored when the data storage system 100 or the dashboard application 160 was installed. If this user information has been stored, a copy of it may be included in the RMA request. Once the data storage system 100 receives the RMA, at 653 the storage controller 113 may generate (for printing) a shipping label for sending the flawed storage device to the manufacturer or repair depot.

In some cases, the problem fix database record 300 (FIG. 3) includes computer-executable instructions, such as a script, in a field 313 (FIG. 3) for resolving all or part of the issue related to the flaw. In these cases, the storage controller 113 (FIG. 1) causes these instructions to be executed at 656.

Figure 9:
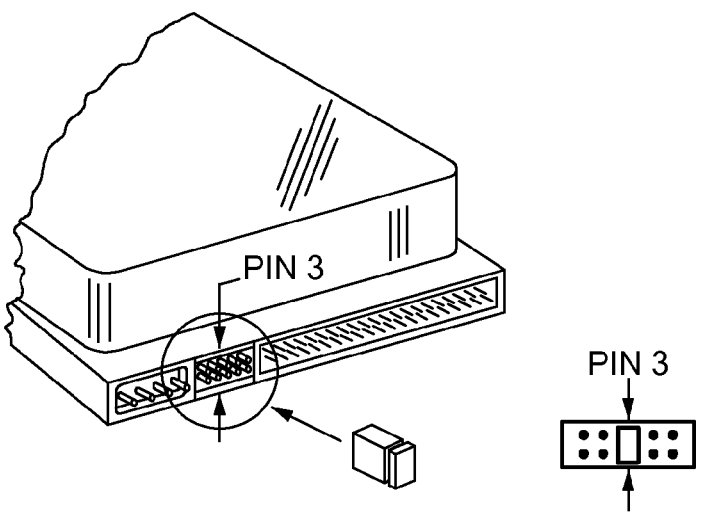
FIG. 9 illustrates an exemplary user interface display of instructions presented to a user, in accordance with embodiments of the present invention.

In some cases, the problem fix database record 300 (FIG. 3) includes text and/or graphics in a field 316 (FIG. 3) to be displayed to the user, such as to display instructions for resolving the issue. In these cases, at 660, the storage controller 113 displays the text or graphic, such as on the touchscreen 540 (FIG. 5) or on the dashboard application 160 (FIG. 1). FIG. 9 illustrates an exemplary display of such instructions.

Returning again to FIG. 6, as indicated at 662, optionally, the storage controller 113 (FIG. 1) may send an e-mail message, a Short Message Service (SMS) message or another type of message, or the storage controller 113 may place an outgoing telephone call to a predetermined telephone number, such as a system administrator, and deliver a message using speech synthesis or a prerecorded message to notify the recipient of the identified flaw and/or to provide information about resolving an issue related to the flaw and/or (later) to indicate that the flaw has been corrected.

Figure 10:
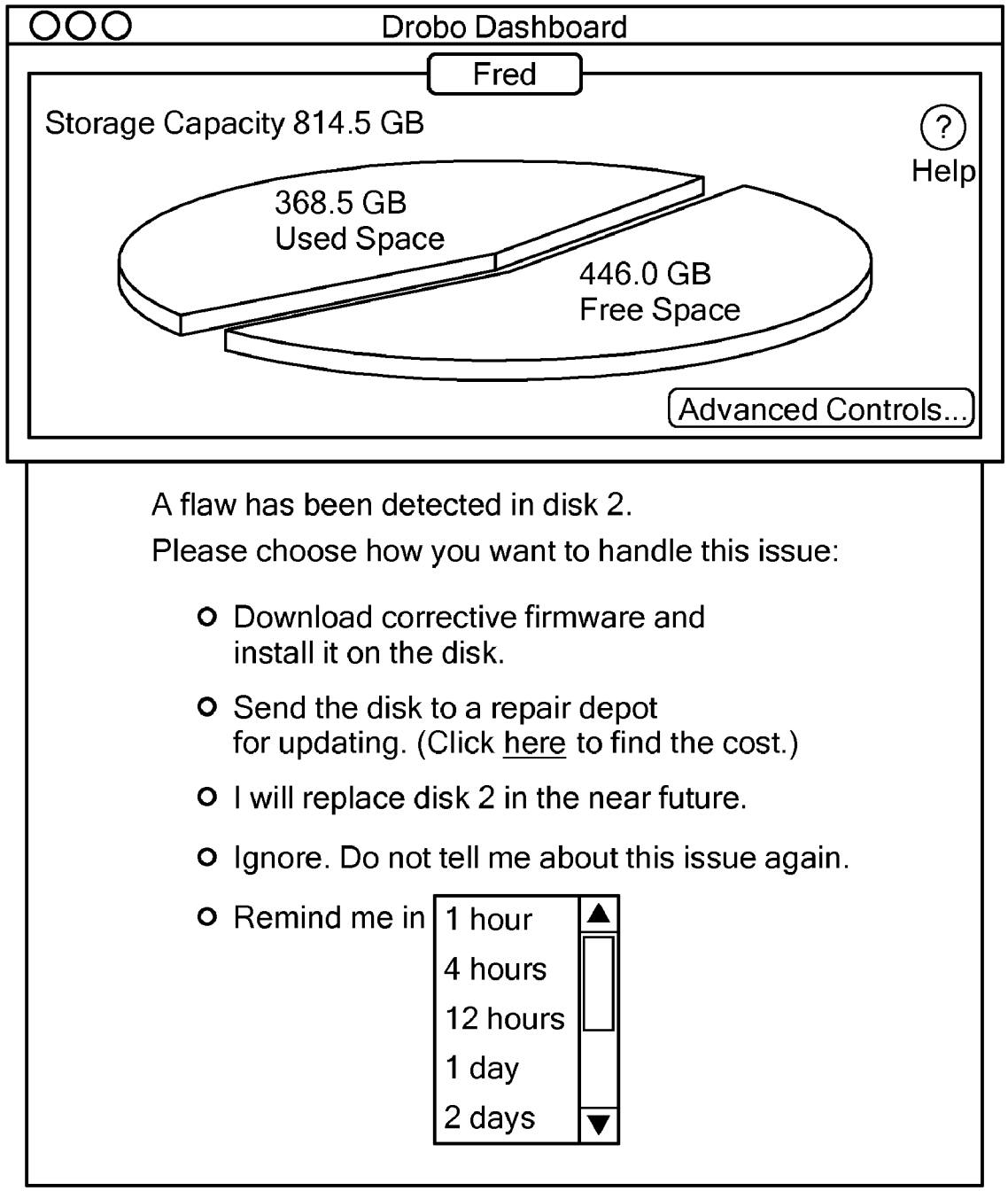
FIG. 10 illustrates an exemplary user interface display of a menu of user choices, in accordance with embodiments of the present invention.

In some embodiments, at 663, the user is presented with a number of menu options on the touchscreen 540 (FIG. 5) or on the dashboard application 160 (FIG. 1). Each menu option corresponds to a different approach to resolving the issue. Some representative approaches are shown in FIG. 6. For example, the choices may include: download corrective firmware and install the firmware in the flawed storage device; print a shipping label to a repair depot, which will install the firmware and possibly bill the user for this service; replace the storage device with another storage device; or ignore the issue. FIG. 10 illustrates an exemplary display of such choices. At 666, (FIG. 6) the storage controller 113 receives a user input selecting one of the presented options. Control then passes to a module 670, 673, 676 or 683, depending on which option the user chose, to implement the chosen option.

For example, if corrective firmware needs to be obtained from a server, the user may be asked for permission to communicate with the server and, if the user grants permission, at 676 the corrective firmware is obtained from the server. At 680, the corrective firmware is installed, as described above. In some cases, the user may be asked for the location of the corrective firmware, and at 676 the corrective firmware is obtained from the location specified by the user. For example, the user may have previously obtained the corrective firmware and stored it on the user computer 106. (FIG. 1)

Once a flaw has been corrected, the data storage system 100 may send a message to the storage device flaw information server 163. The message may identify the storage device, whose flaw has been corrected, as well as identifying the flaw that has been corrected. The storage device flaw information server 163 may store this information in the installed storage devices database 180. For example, the field 416 (FIG. 4) in the installed storage devices database record 400 (FIG. 4) may be filled in with information about the corrected flaw.

Displays and user interfaces described with reference to the touchscreen 540 (FIG. 5) of the data storage system 100 may optionally or alternatively be provided by the dashboard application 160 (FIG. 1) or by another component being executed by the user computer 106. Similarly, other functions performed by the data storage system 100 may optionally or alternatively be performed by the dashboard application 160 or by another component being executed by the user computer 106.

Optionally or additionally, the flaw detection server 161 (FIG. 1) may perform some or all of the functions that are performed by the storage controller 113, in relation to identifying and correcting flaws, as well as notifying a user of a flaw. Services provided by the flaw detection server 161 may be available on a paid or an unpaid subscription basis.

Although data storage systems and flaw detectors have been described using disks as exemplary storage devices, the descriptions also apply to other types of storage devices, such as tape drives, optical storage devices, etc.

A data storage system, a storage device flaw information server and a flaw detection server have been described as each including a processor controlled by instructions stored in a memory. Of course, each of these processors may be a multi-core processor or it may be implemented with multiple processor or multiple computers. Conversely, one processor or computer may be used to implement two or more of the above-described system and/or servers. The memory may be random access memory (RAM), read-only memory (ROM), flash memory or any other memory, or combination thereof, suitable for storing control software or other instructions and data. Some of the functions performed by the data storage system or the servers have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, although some aspects of data storage system and the servers have been described with reference to flowcharts, those skilled in the art should readily appreciate that functions, operations, decisions, etc. of all or a portion of each block, or a combination of blocks, of the flowchart may be combined, separated into separate operations or performed in other orders. Moreover, while the embodiments are described in connection with various illustrative record fields, one skilled in the art will recognize that the system may be embodied using a variety of record structures. Furthermore, disclosed aspects, or portions of these aspects, may be combined in ways not listed above. Accordingly, the invention should not be viewed as being limited to the disclosed embodiment(s).

The invention claimed is:

1. A processor-implemented method for automatically providing information about a flawed data storage device, the method comprising:
    automatically storing, in a computerized database, information about a plurality of data storage devices having respective flaws, the information including information usable to automatically identify one or more flawed data storage devices installed in an external data storage system and information about each of the flaws;
    automatically fetching, from the database, information about at least one of the plurality of data storage devices having a respective flaw and information about the respective flaw;
    automatically providing the fetched information, via a computer network port, to an external data storage system configured such that one or more data storage devices can be user-swappably installed in the external data storage system;
    automatically obtaining, by the external data storage system, the provided information;
    automatically fetching information from a data storage device installed in the external data storage system, the fetched information comprising information about the installed data storage device; and
    using the provided information obtained by the external data storage system and the fetched information about the installed data storage device to automatically identify the installed data storage device as being flawed.

2. A method according to claim 1, wherein:
    the information about the flaw identifies firmware; the method further comprising:
    automatically installing the identified firmware into the identified data storage device.

3. A method according to claim 2, further comprising automatically obtaining the identified firmware from a remote server prior to installing the firmware into the identified data storage device.

4. A method according to claim 1, wherein:
    the information about the flaw comprises a plurality of computer-executable instructions; the method further comprising:
    automatically executing the instructions by a processor within the external data storage system.

5. A method according to claim 1, further comprising displaying information about the identified data storage device on a user interface.

6. A method according to claim 5, wherein displaying the information about the identified data storage device comprises displaying information identifying the identified data storage device.

7. A method according to claim 1, further comprising displaying information about the flaw on a user interface.

8. A method according to claim 1, wherein obtaining the information about the flaw comprises obtaining the information from a server.

9. A method according to claim 1, wherein:
    obtaining the information about the flaw comprises obtaining information about resolving an issue related to the flaw; the method further comprising:
    displaying the information about resolving the issue related to the flaw.

10. A method according to claim 9, wherein displaying the information about resolving the issue related to the flaw comprises:
    displaying a plurality of user options; the method further comprising:
    receiving a user input indicating selection of one of the displayed user options.

11. A method according to claim 10, further comprising, in response to receiving the input, automatically implementing the selected option.

12. A method according to claim 10, wherein:
    the information about the flaw identifies firmware; the method further comprising:
    in response to receiving the input, automatically installing firmware into the identified data storage device.

13. A method according to claim 12, wherein automatically installing the firmware comprises automatically obtaining the firmware from a remote server prior to installing the firmware into the identified data storage device.

14. A method according to claim 12, wherein automatically installing the firmware comprises reading the firmware from a user-specified location.

15. A method according to claim 9, wherein displaying the information about resolving the issue related to the flaw comprises displaying user instructions for resolving the issue related to the flaw.

16. A method according to claim 9, wherein displaying the information about resolving the issue related to the flaw comprises automatically generating a document for use in shipping the flawed data storage device.

17. A method according to claim 16, further comprising:
    automatically obtaining authorization to send the identified data storage device to a vendor;
    wherein the automatically generated document includes a reference to the authorization.

18. A method according to claim 1, further comprising checking, based on a predetermined schedule, availability of information about a flaw in a data storage device.

19. A method according to claim 1, further comprising checking, in response to installation of a data storage device in the data storage system, availability of information about a flaw in the data storage device.

20. A method according to claim 1, further comprising receiving a notification, from outside the data storage system, indicating availability of information about a flaw in a data storage device.

21. A method according to claim 1, further comprising:
    storing the information about the flaw in a memory associated with the data storage system;
    wherein automatically fetching the information from the data storage device and using the information about the flaw and the information about the installed data storage device to identify the installed data storage device as being flawed are performed in response to installation of the data storage device in the data storage system.

22. A method according to claim 1, wherein the flaw involves an incompatibility between the data storage system and a user computer communicably coupled to the data storage system.

23. A method according to claim 1, wherein the flaw involves an incompatibility between the data storage system and a network interface device external to the data storage system.

24. A processor-implemented method for automatically identifying a flawed data storage device installed in a data storage system, the data storage system configured to manage a plurality of user-swappable data storage devices installed therein, the method comprising:
   automatically obtaining information from outside the data storage system about a flaw in a data storage device, including obtaining information about resolving an issue related to the flaw;
   automatically fetching information from a data storage device installed in the data storage system, the information comprising information about the installed data storage device;
   using the information about the flaw and the information about the installed data storage device to automatically identify the installed data storage device as being flawed; and
   displaying the information about resolving the issue related to the flaw, including displaying user instructions for resolving the issue related to the flaw.

25. A processor-implemented method for automatically identifying a flawed data storage device installed in a data storage system, the data storage system configured to manage a plurality of user-swappable data storage devices installed therein, the method comprising:
   automatically obtaining information from outside the data storage system about a flaw in a data storage device, including obtaining information about resolving an issue related to the flaw;
   automatically fetching information from a data storage device installed in the data storage system, the information comprising information about the installed data storage device;
   using the information about the flaw and the information about the installed data storage device to automatically identify the installed data storage device as being flawed; and
   displaying the information about resolving the issue related to the flaw, including automatically generating a document for use in shipping the flawed data storage device.

26. A method according to claim 25, further comprising:
   automatically obtaining authorization to send the identified data storage device to a vendor;
   wherein the automatically generated document includes a reference to the authorization.

27. A processor-implemented method for automatically identifying a flawed data storage device installed in a data storage system, the data storage system configured to manage a plurality of user-swappable data storage devices installed therein, the method comprising:
   automatically obtaining information from outside the data storage system about a flaw in a data storage device;
   automatically fetching information from a data storage device installed in the data storage system, the information comprising information about the installed data storage device;
   using the information about the flaw and the information about the installed data storage device to automatically identify the installed data storage device as being flawed; and
   storing the information about the flaw in a memory associated with the data storage system;
   wherein automatically fetching the information from the data storage device and using the information about the flaw and the information about the installed data storage device to identify the installed data storage device as being flawed are performed in response to installation of the data storage device in the data storage system.

28. A processor-implemented method for automatically identifying a flawed data storage device installed in a data storage system, the data storage system configured to manage a plurality of user-swappable data storage devices installed therein, the method comprising:
   automatically obtaining information from outside the data storage system about a flaw in a data storage device;
   automatically fetching information from a data storage device installed in the data storage system, the information comprising information about the installed data storage device; and
   using the information about the flaw and the information about the installed data storage device to automatically identify the installed data storage device as being flawed;
   wherein the flaw involves an incompatibility between the data storage system and a user computer communicably coupled to the data storage system.

29. A processor-implemented method for automatically identifying a flawed data storage device installed in a data storage system, the data storage system configured to manage a plurality of user-swappable data storage devices installed therein, the method comprising:
   automatically obtaining information from outside the data storage system about a flaw in a data storage device;
   automatically fetching information from a data storage device installed in the data storage system, the information comprising information about the installed data storage device; and
   using the information about the flaw and the information about the installed data storage device to automatically identify the installed data storage device as being flawed;
   wherein the flaw involves an incompatibility between the data storage system and a network interface device external to the data storage system.

30. A data storage system comprising:
   a server and a client, the server comprising:
      a first computer network port;
      a database configured to store information about data storage devices having respective flaws, including information usable to automatically identify each of the data storage devices; and
      a processor coupled to the computer network port and to the database and configured to automatically:
         fetch, from the database, information about a data storage device having a flaw, including information usable to automatically identify the data storage device having the flaw; and
         provide the fetched information, via the first computer network port, to the client; wherein the client comprises:
      a second computer network port, the client being communicably coupled to the server via the second computer network port;
      a plurality of bays, each bay configured to user-swappably receive a data storage device installed therein;
      a data storage controller coupled to the plurality of bays and configured to:
         manage a plurality of data storage devices installed in the plurality of bays;

automatically fetch information about the plurality of installed data storage devices from the plurality of data storage devices;

automatically obtain information about a flaw in a data storage device, via the second computer network port, from the server; and use the obtained information about the flaw and the information about at least one of the installed data storage devices to automatically identify the at least one of the installed data storage devices as being flawed.

31. A data storage device flaw information server, comprising:

a computer network port;

a database configured to store information about data storage devices having respective flaws, including information usable to automatically identify each of the data storage devices; and a processor coupled to the computer network port and to the database and configured to automatically:

receive, via the computer network port, from a first external system, information about a data storage device having a flaw, including information usable to automatically identify the data storage device;

store the received information in the database;

receive, via the computer network port, information identifying a data storage system having a data storage device installed therein, including information identifying the data storage device installed in the data storage system;

in response to receiving the information identifying the data storage system having the storage device installed therein, query the database for information about a data storage device that has a flaw and that corresponds to the information identifying the data storage device installed in the data storage system; and if the query is successful, fetch, from the database, information about the data storage device having the flaw, including information usable to automatically identify the data storage device having the flaw and provide, via the computer network port, the fetched information to at least one of the data storage system and a computer associated with the data storage system.

32. A data storage device flaw information server according to claim 31, wherein the processor is configured to perform the query in response to receiving the information about the storage device having the flaw.

33. A data storage device flaw information server, comprising:

a computer network port;

a database configured to store information about data storage devices having respective flaws, including information usable to automatically identify each of the data storage devices; and a processor coupled to the computer network port and to the database and configured to automatically:

fetch, from the database, information about a data storage device having a flaw, including information usable to automatically identify the data storage device having the flaw; and provide the fetched information, via the computer network port, to an external data storage system configured such that the data storage device can be user-swappably installed in the data storage system.

34. A data storage device flaw information server according to claim 33, wherein:

the processor is further configured to automatically:

receive, via the computer network port, from a first external system, information about a data storage device having a flaw, including information usable to automatically identify the data storage device; and store the received information in the database.

35. A data storage device flaw information server according to claim 34, wherein the information from the first external system about the data storage device comprises firmware for correcting the flaw in the data storage device.

36. A data storage device flaw information server according to claim 33, wherein the processor is further configured to provide the fetched information to the external data storage system in response to a request from the external data storage system.

37. A data storage device flaw information server according to claim 33, wherein the processor is further configured to provide the fetched information to at least one of the external data storage system and to a computer associated with the external data storage system.

38. A tangible non-transitory computer readable medium having computer readable program code stored thereon for automatically providing information about a flawed data storage device, the computer readable program code comprising program code configured to automatically:

store, in a computerized database, information about a plurality of data storage devices having respective flaws, the information including information usable to automatically identify one or more flawed data storage devices installed in an external data storage system and information about each of the flaws;

fetch, from the database, information about at least one of the plurality of data storage devices having a respective flaw and information about the respective flaw; and provide the fetched information, via a computer network port, to an external data storage system configured such that one or more data storage devices can be user-swappably installed in the external data storage system.

39. A tangible non-transitory computer readable medium according to claim 38, the computer readable program code comprising program code configured to automatically:

obtain, by the external data storage system, the provided information;

fetch information from a data storage device installed in the external data storage system, the fetched information comprising information about the installed data storage device; and use the provided information obtained by the external data storage system and the fetched information about the installed data storage device to automatically identify the installed data storage device as being flawed.

40. A processor-implemented method for providing information about a flawed data storage device, the method comprising:

automatically storing, in a computerized database, information about a plurality of data storage devices having respective flaws, the information including information usable to automatically identify one or more flawed data storage devices installed in an external data storage system and information about each of the flaws;

automatically fetching, from the database, information about at least one of the plurality of data storage devices having a respective flaw and information about the respective flaw; and automatically providing the fetched information, via a computer network port, to an external data storage system configured such that one or more data storage devices can be user-swappably installed in the external data storage system.

* * * * *

UNITED STATES PATENT AND TRADEMARK OFFICE
CERTIFICATE OF CORRECTION

PATENT NO. : 8,225,135 B2  Page 1 of 1
APPLICATION NO. : 12/823732
DATED : July 17, 2012
INVENTOR(S) : Geoffrey S. Barrall et al.

It is certified that error appears in the above-identified patent and that said Letters Patent is hereby corrected as shown below:

In Column 22, Line 16, Claim 37
replace "data storage system and to a computer"
with "data storage system and a computer"

Signed and Sealed this
Fourth Day of September, 2012

David J. Kappos
*Director of the United States Patent and Trademark Office*